June 16, 1925.
A. GANZ
1,542,230
WELDING TORCH
Filed Dec. 13, 1922
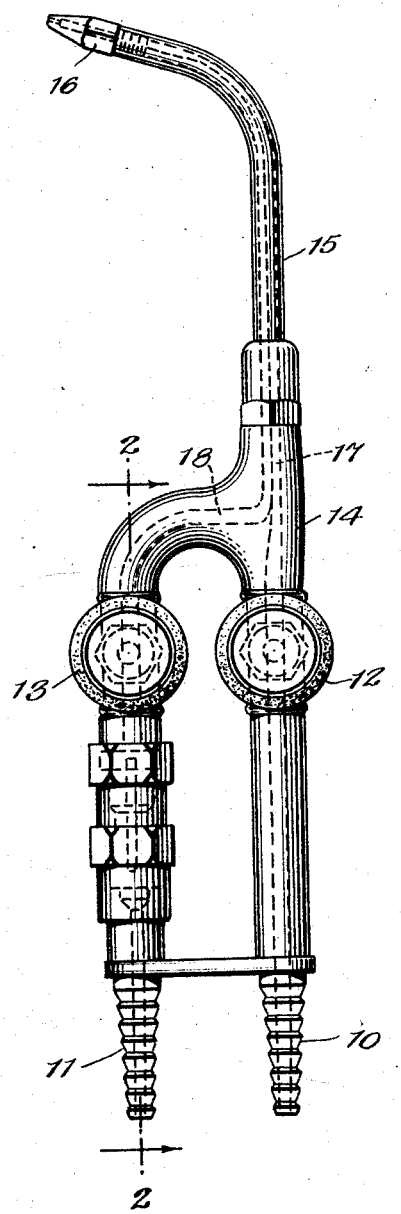
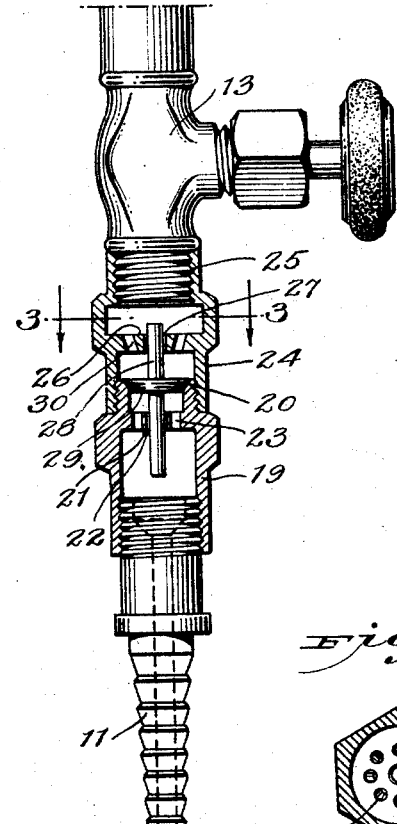
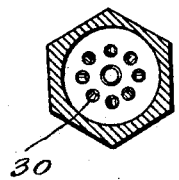
INVENTOR
Adolf Ganz
BY
George Cook & Sons
ATTORNEYS Patented June 16, 1925.

1,542,230

UNITED STATES PATENT OFFICE.

ADOLF GANZ, OF NEW BRIGHTON, NEW YORK.

WELDING TORCH.

Application filed December 13, 1922. Serial No. 606,590.

*To all whom it may concern:*

Be it known that I, ADOLF GANZ, a citizen of the United States, and a resident of New Brighton, borough of Richmond, in the county of Richmond and State of New York, have made and invented certain new and useful Improvements in Welding Torches, of which the following is a specification.

My invention relates to a blow pipe or welding torch and has for its object to provide a device of this character which may be used with the relatively low pressure illuminating gas and with the relatively high pressure oxygen and wherein the relatively high pressure oxygen will be prevented from flowing back into the relatively low pressure illuminating gas line should for any reason the outlet of the blow pipe or torch become clogged or stopped up.

A further object is to accomplish the aforementioned ends in a simple and expeditious manner and wherein the means which are used to prevent the oxygen from flowing back into the relatively low pressure illuminating gas line will not in any way interfere with the proper flow of relatively low pressure illuminating gas when the blow torch is operating in the proper manner.

A further object is to so design and arrange the various parts going to make up my novel blow torch that they may be easily and economically manufactured and wherein the device may be readily taken apart for inspection or cleaning, and with the foregoing and other objects in view, my invention consists in the improved blow pipe or welding torch illustrated in the accompanying drawing and hereinafter described and claimed, and in such variations and modifications thereof as will be obvious to those skilled in the art to which my invention relates, it being understood that changes may be made within the scope of what is claimed without departing from the spirit thereof.

The preferred embodiment of my invention is disclosed in the accompanying drawing, wherein:

Figure 1 is a view in elevation of a welding torch embodying the characteristic features of my invention;

Figure 2 is an enlarged view and partially in section showing the illuminating gas inlet and accompanying parts;

Figure 3 is a view in cross section taken on the line 3—3 of Figure 2.

Referring specifically to the several views, wherein similar reference numerals designate corresponding parts throughout, the blow pipe or welding torch is formed with the oxygen inlet pipe 10 and illuminating gas inlet pipe 11. A suitable shut-off valve 12 is located in the oxygen pipe line, while a similar valve 13 controls the illuminating gas supply. An elbow T 14 is joined to the gas and oxygen lines and supports the nozzle 15 which is provided at its extreme end with the mixing tip 16 from which the oxygen and gas flow and combine to provide the customary welding flame. The oxygen conduit is shown in dotted lines as at 17 and the gas conduit or duct as at 18.

As shown more clearly in Figure 2, the gas inlet pipe 11 threadedly engages a housing 19 at the outer extremity of which is provided a beveled valve seat 20. A spider or cage 21 is situated below the valve seat 20 and is provided with the central valve stem guide opening 22 and adjacent ducts 23, through which latter the gas is adapted to flow. Threadedly secured to the extremity of the housing 19 is a casing 24, the same in turn being threaded at its remote extremity 25 to the end of the gas controlling valve 13.

The casing 24 is provided intermediate its ends with the diaphragm 26 which is provided with the central aperture 27 which is in alignment with the aperture 22 and is adapted to slidably receive the stem 28 of the valve proper therethrough. Carried upon the valve stem 28 is the valve head 29, the same being of what is known as the poppet valve type, and adapted to seat against the bevelled valve seat 20. The valve stem and valve head are of limited size so as to be easily actuated and under the very small pressure of the illuminating gas line. The diaphragm 26 is further provided with the openings or ducts 30 extending therethrough and arranged in a circle around the central aperture, as more clearly disclosed in Figure 3.

The axes of the apertures 30 are at an angle to the axes of the casing 24 and housing 19 and are so placed that any backflow of oxygen from the oxygen line 10 which passes the valve 13 and flows toward the check valve will pass through the apertures 30 and flow toward the center of the casing 24 and accordingly hit directly upon the valve head, closing the same and thereby preventing the oxygen from passing back into the illuminating gas line 11.

By constructing my blow torch as above outlined I am able to successfully prevent any backflow of the high pressure oxygen and at the same time have provided a valve which will readily open under the relatively low pressure of the illuminating gas, and have so arranged the various parts that they may be readily taken apart, cleaned, inspected and readily reassembled.

Having thus described and explained my invention, I claim and desire to secure by Letters Patent:

A valve structure comprising a housing provided at a point between its ends with a partition wall having a central guide opening and a series of eccentrically positioned ducts passing therethrough, the said housing being of greater internal diameter at one side of the partition wall than at the opposite side thereof, the housing being provided at that end of smaller internal diameter with a valve seat, a valve stem having one end portion slidably received in the central opening of the partition, a valve disk carried at the intermediate portion of the stem and adapted to close against said seat, a casing provided at a point between its ends with a diaphragm wall having a central guide opening which slidably receives the other end portion of the valve stem, the diaphragm also having a series of eccentrically positioned ducts passing therethrough and which converge inwardly toward the center of the valve disk, the casing being detachably connected at one end with the smaller end of the housing, the internal diameter of the casing at one side of the diaphragm being greater than the internal diameter at the opposite side of the diaphragm, the valve disk being received in the smaller end portion of the casing and the opposed side surfaces of the diaphragm and the valve disk lying in parallel planes whereby the said surfaces may meet in close contact with each other and the valve disk may completely close the ends of the converging ducts in the diaphragm.

Signed at New York, borough of Manhattan, in the county of New York and State of New York, this 12 day of December, A. D. 1922.

ADOLF GANZ.

Witnesses:
A. M. LINDENSTRUTH,
ANNE V. WALSH.